United States Patent [19]

Ahola

[11] Patent Number: 4,978,903

[45] Date of Patent: Dec. 18, 1990

[54] APPARATUS FOR THE CONTROL OF A THREE-PHASE A.C. MOTOR, ESPECIALLY A SQUIRREL-CAGE MOTOR

[75] Inventor: Aarno Ahola, Lahti, Finland

[73] Assignee: A-teollisuus Oy, Lahti, Finland

[21] Appl. No.: 380,416

[22] Filed: Jul. 17, 1989

[30] Foreign Application Priority Data

Jul. 19, 1988 [FI] Finland .................. 883415

[51] Int. Cl.$^5$ .......................... H02P 1/26; H02P 7/62
[52] U.S. Cl. .................................. 318/778; 318/801; 318/809
[58] Field of Search ............ 318/727, 728, 729, 732, 318/740, 741, 756, 778, 780, 799, 800, 801, 802, 803, 809, 810, 811

[56] References Cited

U.S. PATENT DOCUMENTS

| | | | |
|---|---|---|---|
| 3,332,008 | 7/1967 | Mueller et al. | 318/809 X |
| 3,387,196 | 6/1968 | Graham et al. | 318/799 |
| 3,526,817 | 9/1970 | Plambeck | 318/227 |
| 3,564,364 | 2/1971 | Neff | 318/809 X |
| 3,665,498 | 5/1972 | Kelemen et al. | 318/756 X |
| 4,424,474 | 1/1984 | Durr et al. | 318/799 X |
| 4,459,531 | 7/1984 | Dumont et al. | 318/756 |
| 4,469,998 | 9/1984 | Nola | 318/802 X |
| 4,482,853 | 11/1984 | Bhavsar | 318/778 |

FOREIGN PATENT DOCUMENTS

| | | | |
|---|---|---|---|
| 133030 | 3/1976 | Denmark . | |
| 2718604 | 11/1978 | Fed. Rep. of Germany . | |
| 2721287 | 11/1978 | Fed. Rep. of Germany . | |
| 3009445 | 9/1981 | Fed. Rep. of Germany | 318/799 |
| 58-29391 | 2/1983 | Japan | 318/801 |
| 0788324 | 12/1980 | U.S.S.R. | 318/809 |
| 0884064 | 11/1981 | U.S.S.R. | 318/810 |
| 0890540 | 12/1981 | U.S.S.R. | 318/810 |

*Primary Examiner*—Bentsu Ro

[57] ABSTRACT

The present invention is an apparatus for the control of a three-phase a.c. motor, especially a squirrel-cage motor. The apparatus includes inverse-parallel connected solid-state components (D,T) in each phase. At least one of the components is controllable. In the apparatus, the control circuit of at least one controllable solid-state component (T), e.g. thyristor, in each phase is connected via resistors ($R_2$) to the control circuits in the other two phases.

9 Claims, 1 Drawing Sheet

APPARATUS FOR THE CONTROL OF A THREE-PHASE A.C. MOTOR, ESPECIALLY A SQUIRREL-CAGE MOTOR

FIELD OF THE INVENTION

The present invention relates to an apparatus for the control of a three-phase a.c. motor, especially a squirrel-cage motor. The apparatus comprises inverse-parallel connected solid-state components in each phase. At least one of the components is controllable.

BACKGROUND OF THE INVENTION

Because of their large starting current, squirrel-cage motors cannot always be started simply by closing a switch in the stator circuit, because the large current surge may generate a voltage swing that may cause e.g. disturbances in the operation of other electrical equipment. For this reason, different starting procedures are needed.

At present, squirrel-cage motors are often started using star-delta connection, in which the motor, whose normal connection mode is the delta connection, is first connected in the star mode and then changed to the delta connection mode. The star-delta connection is complex and expensive.

An asynchronous motor can also be started using a thyristor circuit as proposed in DE patent publication No. 2 718 604, in which thyristors are used. According to publication DE No. 2 721 287, a diode can be connected in parallel with the thyristor in such manner that the diode and the thyristor form an inverse-parallel circuit. The circuits proposed in the DE publication are complex.

SUMMARY OF THE INVENTION

The object of the present invention is to eliminate the drawbacks referred to above. The apparatus of the invention for controlling a three-phase a.c. motor is characterized in that the control circuit of at least one control-lable solid-state component, e.g. thyristor, in each phase is connected via resistors to the control circuits in the other two phases.

A preferred embodiment of the apparatus of the invention is characterized in that the control circuit comprises a first resistor whose first terminal is connected via a solid-state component, e.g. a diode, to the motor's input terminal for the phase in question, and another resistor, whose first terminal is connected to the second terminal of the first resistor while its second terminal is connected to a point between the corresponding solid-state component, e.g. diode, and first resistor in the control circuit of one of the other two phases.

The features of other preferred embodiments of the apparatus of the invention are presented in the other claims.

The apparatus of the invention makes it possible to start a motor without a jerk, especially in the case of high-power motors.

BRIEF DESCRIPTION OF THE DRAWINGS

In the following, the invention is described by the aid of an example with reference to the drawing attached, in which.

DESCRIPTION OF THE PREFERRED EMBODIMENTS

Figure 1:
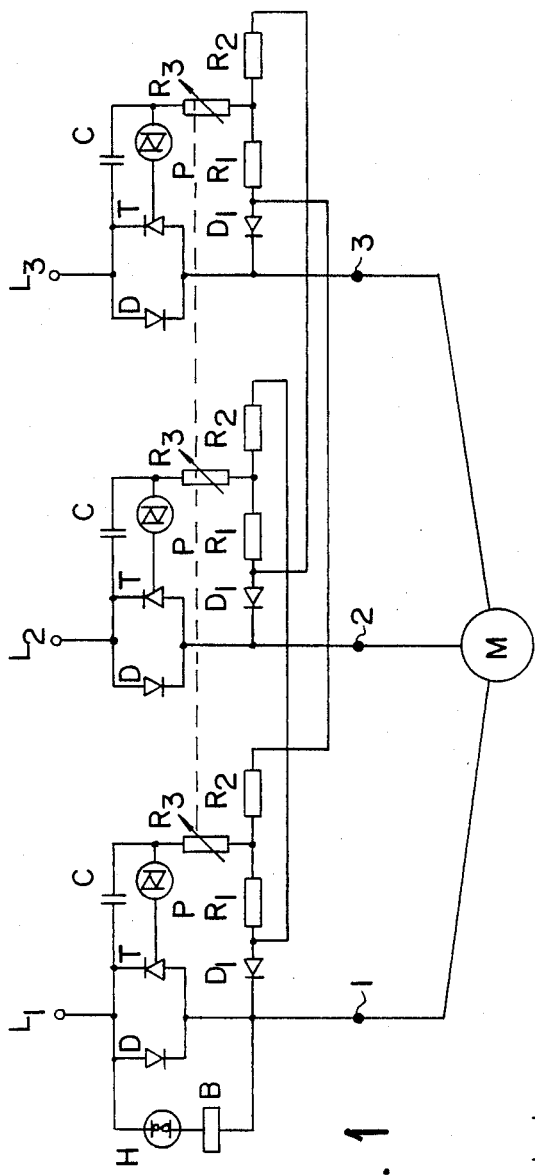
FIG. 1 represents a squirrel-cage motor and its starter circuit.

FIG. 1 shows a three-phase squirrel-cage motor M and its starter, which, in each phase, comprises a diode D whose anode is connected to the main power supplier $L_1$, $L_2$ and $L_3$ while its cathode is connected to the motor input terminal 1, 2 or 3, and a thyristor T connected in inverse-parallel with the diode. The cathode of the thyristor is connected to the main power supplies while its anode is connected to the motor input terminal.

The firing circuit of each thyristor consists of a first resistor $R_1$, whose first terminal is connected via diode $D_1$ to the motor input terminal for the phase in question, and a second resistor $R_2$ of a resistance value equal to that of the first resistor. The first terminal of the second resistor is connected to the second terminal of the first resistor while the second terminal of the second resistor $R_2$ is connected to a point between the corresponding diode $D_1$ and first resistor $R_1$ in the control circuit of another phase.

In addition, the firing circuit comprises a third resistor $R_3$, which is adjustable and has its first terminal connected between the first and second resistors while its second terminal is connected via a DIAC P to the grid of the thyristor and also, via a capacitor C, to the main power supplies phase.

Figure 3:
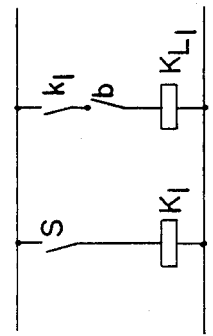
FIG. 3 is a circuit diagram for an individual phase.
Figure 2:
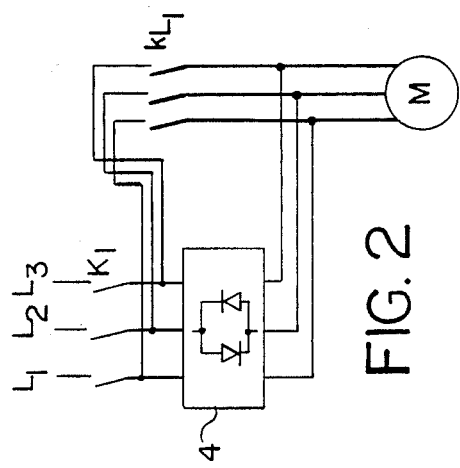
FIG. 2 illustrates how the motor is controlled via the starter or directly from the main power source.

FIG. 2 shows a circuit which is used for starting the motor with a starter 4 constructed as illustrated in FIG. 1, and which allows the motor to be supplied directly from the main power supplies during normal operation. The motor is connected to the main power supply via a main power supplies switch $k_1$, which is controlled by means of a switch s connected in series with the relay $K_1$ of the switch as illustrated by the diagram in FIG. 3. Connected in series with the main power supply switch are a switch b controlled by the relay B of a unit monitoring the firing angle of the thyristor in the inverse-parallel circuit of the first phase, and the relay $K_{L1}$ of a switch $k_{L1}$ connected in parallel with the starter.

The action of the circuit is as follows. When switch s is closed, the main power supply switch $k_1$ is closed. The main power supply voltage is now applied to the inverse-parallel circuit, a current starts flowing through the glow discharge lamp H in the firing angle monitoring circuit, relay B is energized and switch b is opened. The motor is started. Through diode D, the positive half-cycle of the sinusoidal voltage is passed to the motor, whereas the negative half-cycle of the wave flows via the thyristor T, which is controlled by a firing circuit as shown in FIG. 1. As the motor speed is accelerated, the firing circuit increases the thyristor firing angle until the thyristor conducts during the whole or nearly the whole time of the negative half-cycle and the current through the glow discharge lamp H in the firing angle monitoring circuit stops flowing, causing relay B to release and switch b to be closed. After this, the motor is fed directly from the main power supplies. The rate of acceleration can be adjusted by simultaneously varying the setting of the third resistor in the firing circuit of each phase.

It is obvious to a person skilled in the art that different embodiments of the invention are not restricted to the examples described above, but that they may instead be varied within the scope of the following claims.

I claim:

1. An apparatus for the control of a three-phase a.c. motor, said apparatus comprising:

inverse-parallel connected solid-state components in each phase, at least one of said solid-state components being controllable; and a control circuit for each controllable solid-state component, each control circuit connected to control circuits in other phases in order to form control signals for said controllable solid-state component, so that the control signals are formed in the control circuit by combining signals obtained from other control circuits, each control circuit including three resistors, a first terminal of a second resistor connected to a second terminal of a first resistor and a second terminal of said second resistor connected to a first terminal of a first resistor in a control circuit in some other phase, and a first terminal of a third resistor connected between said first and second resistor and a second terminal of said third resistor connected via a control component to a control electrode of the controllable solid-state component.

2. Apparatus according to claim 1, wherein the first and second resistors have essentially equal resistance values.

3. Apparatus according to claim 1, wherein the third resistor is variable so as to allow adjustment of the rate of acceleration or deceleration of said motor.

4. Apparatus according to claim 3, further comprising means for connecting said variable third resistors in each phase with each other.

5. Apparatus according to claim 1, further comprising a controllable switch enabling the three-phase a.c. motor to be supplied during acceleration and braking via said solid-state components and directly operating from a main power supply during normal operation.

6. Apparatus according to claim 1, further comprising, in at least one of the phases, a monitoring unit for monitoring a firing angle of the controllable solid-state component during accelerating for controlling a switch.

7. Apparatus according to claim 6, wherein the monitoring unit consists of a glow discharge lamp and a relay.

8. Apparatus according to claim 1, further comprising means for monitoring a firing angle of the controllable solid-state component during braking for controlling a switch.

9. Apparatus according to claim 1, wherein the first terminal of said first resistor is connected via a solid-state component to an input terminal of the three-phase a.c. motor for a phase in question.

* * * * *